United States Patent [19]

Hettlinger

[11] Patent Number: 4,883,627

[45] Date of Patent: Nov. 28, 1989

[54] METHOD OF MAKING ELASTOMERIC CUSHION PAD

[76] Inventor: Raymond C. Hettlinger, 2279 Weir Dr., Hudson, Ohio 44236

[21] Appl. No.: 199,456

[22] Filed: May 27, 1988

[51] Int. Cl.⁴ .............................................. B29C 43/02
[52] U.S. Cl. .................................. 264/157; 156/264; 264/294; 264/320
[58] Field of Search ...................... 156/256, 264, 308.2; 264/157, 229, 294, 320, 328.7, 328.16

[56] References Cited

U.S. PATENT DOCUMENTS

| | | | |
|---|---|---|---|
| 2,231,769 | 2/1941 | Merrill | 264/320 |
| 2,549,144 | 4/1951 | Truscott | 264/325 |
| 3,079,642 | 3/1963 | Needham et al. | 264/320 |
| 4,198,037 | 3/1980 | Anderson | 267/153 |
| 4,608,213 | 8/1986 | Kurumizawa et al. | 264/157 |

FOREIGN PATENT DOCUMENTS 516573  1/1940  United Kingdom ................ 264/157

Primary Examiner—Jan H. Silbaugh
Assistant Examiner—Nicholas Krisch
Attorney, Agent, or Firm—Harlan E. Hummer

[57] ABSTRACT

A method for making elastomeric cushion pads which can be used in off-the-road vehicles and in the draft gears of railroad cars. The method includes solidifying a molten mass of the elastomer under a pressure of at least 1000 psi to form an elongated slug of the elastomer which is then cut into a plurality of unfinished cushion pads which are then individually momentarily compressed to remove any permanent set or deformation of the pads which occurs when an uncompressed pad is initially compressed.

14 Claims, 1 Drawing Sheet

---

HEATING SOLID HYTREL POLYESTER ELASTOMER TO A MOLTEN MASS.

↓

SOLIDIFYING THE MOLTEN MASS UNDER PRESSURE OF AT LEAST 1,000 PSI.

↓

CUTTING THE SOLIDIFIED ELASTOMER INTO A PLURALITY OF UNFINISHED CUSHION PADS.

↓

MOMENTARILY COMPRESSING THE UNFINISHED CUSHION PADS TO ELIMINATE PERMANENT SET OF A PAD WHEN THE PAD IS INITIALLY COMPRESSED.

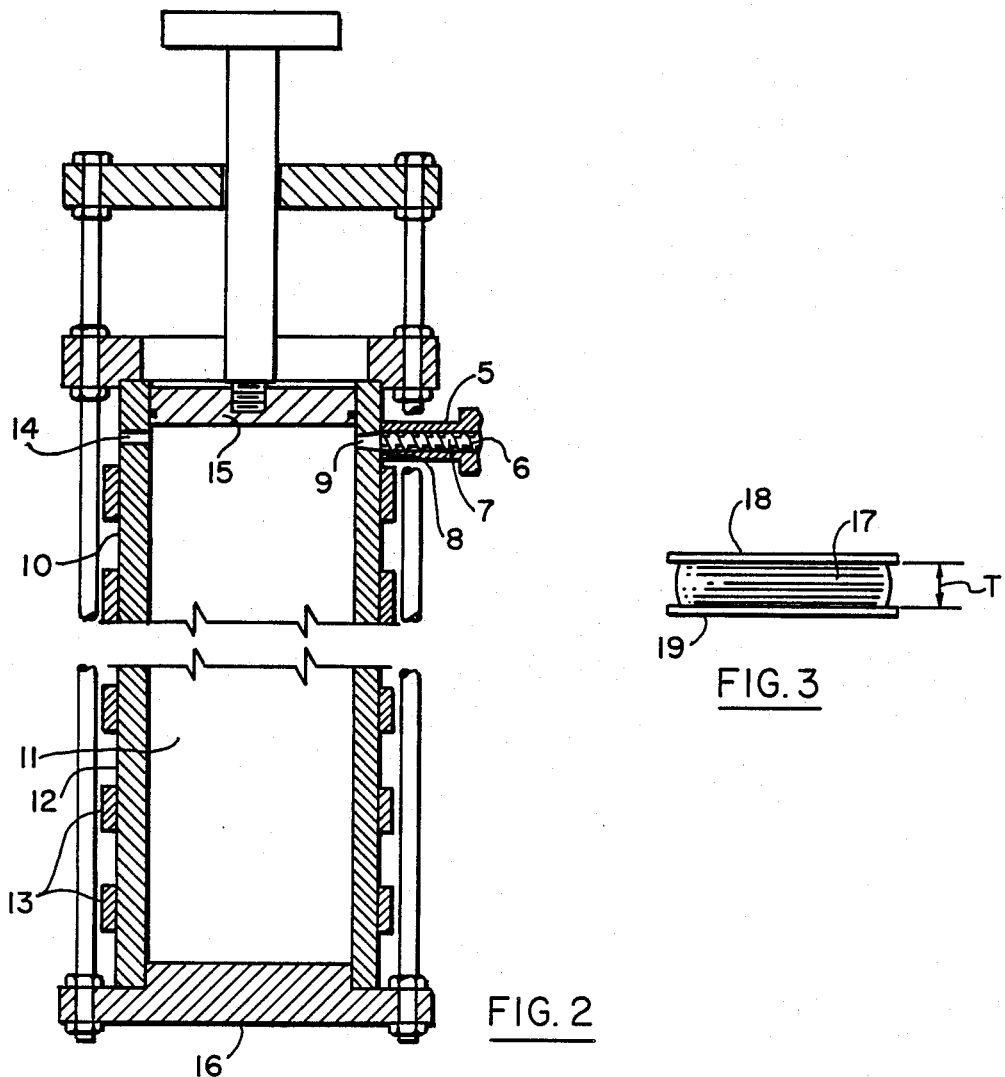

METHOD OF MAKING ELASTOMERIC CUSHION PAD

BACKGROUND OF THE INVENTION

The invention relates to compression springs, especially elastomeric compression springs or cushion pads which are used in off-the-road vehicles, or in the draft gears of railroad cars. More particularly, the invention relates to cusion pads which are composed of polyester elastomeric materials developed and manufactured by Du Pont Company and sold under the company trademark HYTREL which, as indicated in U.S. Pat. No. 4,198,073 at lines 19-25 of column 1, is made from three ingredients, namely, (1) dimethyl terephthalate, (2) polyglycols such as polytetramethylene ether glycol, polyethylene ether glycol, or polypropylene ether glycol, and (3) short chain diols like butanediol and ethylene glycol.

U.S. Pat. No. 4,198,037 discloses a cushion pad which is made of such material by, first, individually molding a cylindrical pad, then annealing the pad, and finally compressing the annealed pad to remove any set the pad might develop upon compression. As indicated, the compression pads are individually molded because they are too large to be formed by the extrusion process. Further, a weight is used to press, by gravity, upon a pad as it is molded.

It has been found that, contrary to the teaching of this patent, compression pads of HYTREL polyester elastomeric material can be produced in an elongated, cylindrical slug of material, cut into a plurality of pads which are then individually compressed to form finished pads without going through the expensive and time consuming process of annealing the pads.

Briefly stated, the invention is in a method of forming a compression spring or cushion pad which is composed of a Hytrel polyester elastomer by (I) heating solid material of the elastomer to a molten mass, (II) charging the molten mass to a heated cylindrical chamber, (III) cooling and solidifying the mass in the chamber under pressure which is at least 1000 pounds per square inch (psi), (IV) removing the solidified cylinder from the chamber and cutting it crosswise into a plurality of pads, and (V) momentarily compressing the cut pads axially to remove any adverse set which develops upon initial compression of an uncompressed pad.

Thus, the invention has a two fold advantage over the prior art. It eliminates the annealing process and the expense of having to stock the many molds which are required to individually mold each pad.

DESCRIPTION OF DRAWING

The invention will be better understood by having reference to the accompanying drawing, wherein:

FIG. 1 is a schematic of the steps of the method of the invention for forming a compression pad;

FIG. 2 is a cross-section of a mold assembly and portion of an extruder used in the method; and FIG. 3 is a side view of a finished pad with attached metal plates.

DETAILED DESCRIPTION OF DRAWING

With particular reference to FIG. 2, there is shown, for example, a barrel-type extruder 5 in which solid pellets of HYTREL 5556 polyester elastomeric material, described in the '037 patent, are charged for heating to a molten mass within the hollow barrel 6 of the extruder 5. A discharge screw 7 is rotated to force the molten elastomeric extrudate from the discharge end 8 of the extruder 5 through the adjacent inlet 9 of a mold assembly 10 which is attached to the extruder 5. The molten extrudate, at a temperature of about 440° F.-450° F., flows from the inlet 9 into a vertically disposed, elongated cylindrical heat chamber 11 of a metal cylinder 12 of the assembly 10. The chamber 11 is preheated to a temperature of about 350° F.-360° F. by any suitable means, e.g. a plurality of similar band-type heaters 13 which are axially spaced around the cylinder 12. The extruder 5 is operated until the chamber 11 is filled and extrudate begins flowing from an overflow outlet 14 which is opposite, and substantially horizontally aligned with, the inlet 9. The extrusion process is stopped and a piston 15 of the assembly 10 is operated by any suitable means to axially compress and exert upon the molten extrudate in the chamber 11, a pressure of at least 1000 psi, until the extrudite cools and solidifies into an elongated cylinder of elastomeric material which is removed from th chamber 11 by, for example, removing the bottom portion 16 of the cylinder 12 and using the piston 15 to push the newly formed elastomeric cylinder from the chamber 11.

The elastomeric cylinder is cut crosswise into a plurality of unfinished cushion pads, each of which has a thickness, measured along the cylindrical axis, which is larger and correlated to the thickness T of a finished cushion pad 17 (FIG. 3). The unfinished cushion pads are each momentarily compressed axially so that the thickness of the finished cushion pad 17 will be in the range of from 45% to 65% of the thickness of the unfinished, uncompressed pad. The pads are compressed to remove undesirable set which occurs when a newly formed uncompressed pad is initially compressed.

A metal plate 18 (FIG. 3) may be sandwiched between a pair of finished pads 17 to form a composite pad which can be used with a plurality of similar pads in the draft gear of a railroad car. Also, the finished cushion pad 17 may be secured between a pair of parallel metal plates 18, 19, as best seen in FIG. 3, so that it can be used with similar cushion pads in the draft gear of a railroad car. The metal plates 18, 19 may be attached to the elastomeric pad 17 by any suitable means as described, for example, in U.S. Pat. Nos. 2,713,483; 3,279,048 and 4,198,037.

Thus, as listed in FIG. 1, the molten extrudate of HYTREL elastomeric material, particularly defined in the '037 patent, is forced to solidify, under pressure, in an elongated cylinder which is then cut into certain lengths for precompressing before they are finally used as compression springs or pads.

The band-type heaters 13 are used to control cooling and solidification of the elastomeric material in large heat chambers wherein cold spots in the chamber can develop and cause uneven cooling throughout the axial length of the cylindrical chamber, such that material closest the piston could solidify first to adversely affect the pressure being exerted by the piston against the elastomeric material. It is important that the band-type heaters from the bottom of the chamber to the top of the chamber, closest the piston, be sequentially shut down, so that the elastomeric material will, in effect, sequentially solidify in the same direction, so that there will be no disruption of pressure against the molten elastomeric material which can occur if elastomeric material, between opposing ends of the heat chamber, solidifies first. It has been found that it is not necessary to control the cooling of the elastomer in relatively small heat chambers, e.g. 3–4 inches in diameter and 2–3 feet in length.

Donut shaped cushion pads can be made by inserting a cylindrical core or mandrel centrally within the cylindrical heat chamber. However, this method may prove impractical from a production standpoint, because the tremendous pressure used in the solidification process causes compressive engagement between the elastomer and metal which may prove difficult in the removal of the doughnut shaped cylinder. The boring of a centrally disposed hole in the elastomeric cylinder may be better, especially since the material removed from the hole is reusable in the extrusion process.

Thus, there has been described a unique method which, unlike the prior art, does not require annealing of the HYTREL elastomeric material to produce an acceptable cushion pad composed of this material. Also, the pads are not individually molded, but are cut from comparatively long cylinders of such material that are molded under great pressure.

Cushion pads of the invention have a variety of uses of which the following are examples: cushioned overhead crane bumpers; off-highway suspension systems for unusually heavy vehicles; cushioning between mine and mill rail cars; push dozer cushions; cushioned tow hitches for large aircraft; cushioned push blades for dozers; cushioned crowd stops for shovels; cushioned trailer hitches for piggy-back trailers on flat cars; draft gears for railcars and safe material handling from one production line to another.

What is claimed is:

1. A method of forming an unannealed cushion pad, comprising the steps of:
   (a) heating solid elastomeric material to a molten mass;
   (b) solidifying the molten mass in an elongated chamber under a pressure of at least one thousand pounds per square inch, the axial length of the chamber being sufficient to form a plurality of cushion pads;
   (c) removing the solidified material from the chamber and, without annealing it, cutting it crosswise into a plurality of cushion pads which have a thickness that is greater than and correlated to the correspondingly measured smaller thickness of a finished cushion pad; and
   (d) compressing each unannealed pad sufficiently to at least substantially reduce permanent deformation of a pad which occurs when an uncompressed pad is initially compressed, to form a finished, unannealed cushion pad.

2. The method of claim 1, wherein the molten mass is solidified in a metal lined cylindrical chamber which is preheated to prevent uneven spot cooling of the mass upon contact with the sides of the chamber.

3. The method of claim 2, wherein the longitudinal axis of the chamber is angularly disposed to the horizontal, and the pressure upon the molten mass therein is exerted by a piston which is movable along the axis of the chamber.

4. The method of claim 3, which includes controlling the cooling and solidification of the molten mass in the chamber.

5. The method of claim 4, wherein a number of band-type heaters are axially spaced around the metal lined chamber to heat the chamber.

6. The method of claim 5, which includes operating the band-type heaters sequentially from the bottom of the chamber farthest from the piston to the top of the chamber closest the piston to insure that solidification will sequentially happen in the same direction.

7. The method of claim 1, wherein the pads are compressed such that their final thickness is between 45% and 65% of their uncompressed thickness.

8. The method of claim 7, wherein the pads are momentarily compressed.

9. The method of claim 8, wherein the elastomer is a polyester elastomeric material.

10. The method of claim 7, which includes securing at least one cushion pad to at least one metal plate.

11. A method of forming an unannealed elastomeric cushion pad, comprising the steps of:
   (a) heating solid polyester elastomeric material, to a molten mass;
   (b) forcing the molten mass into a vertically disposed cylindrically shaped chamber which is heated to a temperature which is sufficient to prevent adverse spot cooling of the molten mass as it enters the chamber;
   (c) cooling the molten elastomer in the chamber under a pressure of at least 1000 psi to solidify the elastomer in a cylinder which has a length, measured along the longitudinal axis, which is sufficient to form a plurality of cushion pads having a desired thickness, also measured along the axis;
   (d) removing the solidified elastomeric cylinder from the chamber and, without annealing it, cutting it crosswise into a plurality of unfinished cushion pads, each of which has a thickness which is greatr than the thickness of a finished pad; and
   (e) at least momentarily compressing the unannealed unfinished cut pads individually such that the thickness of the finished pad will be between 45% and 65% of the uncompressed thickness of the unfinished pad, to produce a precompressed, unannealed cushion pad.

12. The method of claim 11, which includes heating the cylindrical chamber with a number of band-type heaters which are axially spaced around the chamber, prior to the flow of the molten mass into the chamber.

13. The method of claim 11, which includes sequentially cooling and solidifying the molten mass first to enter the chamber and ending with the molten mass last to enter the chamber.

14. The method of claim 11, which includes securing at least one cushion pad to at least one metal plate.

* * * * *